United States Patent [19]
Wells

[11] 3,894,824
[45] July 15, 1975

[54] HYDRAULIC CONTROL FOR PLASTIC INJECTION MOLDING MACHINE

[75] Inventor: John W. Wells, Agawam, Mass.

[73] Assignee: Package Machinery Company, East Longmeadow, Mass.

[22] Filed: Mar. 14, 1973

[21] Appl. No.: 341,315

[52] U.S. Cl. ............... 425/146; 425/150; 425/166
[51] Int. Cl. .................................................. B29f 1/06
[58] Field of Search ........... 425/145, 146, 150, 166, 425/167, 135, 450 R, 155, 162; 137/635.66; 251/31

[56] References Cited
UNITED STATES PATENTS

| | | | |
|---|---|---|---|
| 2,680,883 | 6/1964 | Ashbaugh | 425/166 |
| 3,078,515 | 2/1963 | Wintriss | 425/450 X |
| 3,436,443 | 4/1969 | Hutchinson | 425/145 X |
| 3,452,397 | 7/1969 | Newton | 425/153 |
| 3,509,600 | 5/1970 | Noble | 425/145 |
| 3,520,511 | 7/1970 | Warne | 251/31 X |
| 3,767,339 | 10/1973 | Hunkar | 425/145 |

*Primary Examiner*—Francis S. Husar
*Assistant Examiner*—Carl Rowold
*Attorney, Agent, or Firm*—McCormick, Paulding & Huber

[57] ABSTRACT

An hydraulic control system for a reciprocating screw-type plastic injection molding machine providing for flow rate and pressure control of hydraulic fluid used in opening and closing the mold halves, in rotating the screw to plasticize or prepare the melt, and in thrusting the screw forwardly to inject the plastic melt into the mold cavity defined between the mold halves.

12 Claims, 2 Drawing Figures

HYDRAULIC CONTROL FOR PLASTIC INJECTION MOLDING MACHINE

BACKGROUND OF THE INVENTION

In a reciprocating screw-type plastic injection molding machine, a screw or worm is rotated in the influence of heat to plasticize raw particulate material to form a melt which is advanced toward the nozzle at the front end of the screw. The nozzle is blocked off during this plasticizing phase either by a valve or by blockage at the nozzle or gate caused by solidified plastic left at the nozzle and/or gate when the last plastic article was molded. If a nozzle valve is used, it will be opened and closed in timed relationship with the other operating steps described herein. For simplicity of description, it can be assumed that the nozzle and/or gate passages are closed by blockage which will be forced away by the injection pressure and melted in the plastic flow of the material being injected into the mold cavity to form the next plastic article.

With the nozzle and/or gate passages closed, and with the article-forming mold dies closed or open, the plasticized melt will build up in the machine barrel at the front or nozzle end of the screw and force it rearwardly in the barrel as the screw continues to rotate and to plasticize and feed the material toward the nozzle. Then, when the screw reaches a predetermined rearward position, at which time a sufficient charge of the plastic melt will be at the front end of the screw, screw rotation ends and the screw is then thrust forwardly to inject the melt into the mold or die cavity. Obviously, the mold halves must be tightly closed by this time. After filling the mold cavity, the die or mold halves remain closed for a brief period to allow the molded article to solidify in the cavity. Then they must be opened to discharge the formed article before being again closed to receive the next injection.

In such machine, the mold halves are closed hydraulically, the screw is rotated by a hydraulic motor, and it is thrust forwardly in the injection stroke hydraulically. It is desirable and necessary for efficient operation of the machine to provide the hydraulic fluid for these operations at different but programmed rates of flow and pressure and it is the general object of the present invention to provide a compact and efficient and low cost hydraulic control system capable of being programmed for flow rate and pressure control as desired.

SUMMARY OF THE INVENTION

As will be described in greater detail, the hydraulic control system of the present invention is particularly adapted for a reciprocating screw-type plastic injection molding machine wherein the mold halves are opened and closed hydraulically by a reversible fluid motor actuated by a die control valve. The reciprocating screw in the machine is rotated to plasticize particulate plastic material by a hydraulic motor controlled by an isolation valve, and the screw is thrust forwardly to inject plasticized melt by a reversible fluid motor actuated by an injection control valve. The system has a low pressure reservoir and means defining a main line for pressure flow from the reservoir to both of said control valves and also to said isolation valve, and means is provided defining a drain to said reservoir from the said control valves and isolation valve.

A first driven pump is located in the main line and is capable of high pressure but relatively low rate delivery, such as may be particularly desirable for applying the "lockup" force on the reversible motor which closes the mold halves and which may be desirable in the final advance or injection movement of the screw. A second driven pump is provided and has a capability of high rate but relatively low pressure delivery such as may be desirable for rotation of the screw, for initial closing and opening movement of the molds and for initial injection movement of the screw. This second driven pump has its inlet connected with the reservoir and has an outlet connection with the main line which permits flow only toward the main line. A by-pass valve is connected between the outlet of the said second pump and reservoir and it includes a member hydraulically movable to vary the flow from the second pump outlet to the reservoir and thereby to vary the flow from the second pump to the main line. A first servo valve is connected between the main line and the by-pass valve and has a drain connection to the reservoir. This servo valve is adapted to control the hydraulic pressure on the by-pass movable member. A preferably electric means is provided to modulate the operation of the servo valve and thereby to effect and modulate movement of the member in the by-pass valve.

In addition, an hydraulically operable variable pressure relief valve is provided with its inlet connected to the main line. A second servo valve is connected between the main line and the relief valve and it also has a drain connection to the reservoir. This second servo valve is utilized to control the operating hydraulic pressure on the relief valve. A preferably electrical means is provided for modulating the operation of the second servo valve and thereby to select and vary the pressure in the main line.

DETAILED DESCRIPTION OF THE PREFERRED EMBODIMENT

Figure 1:
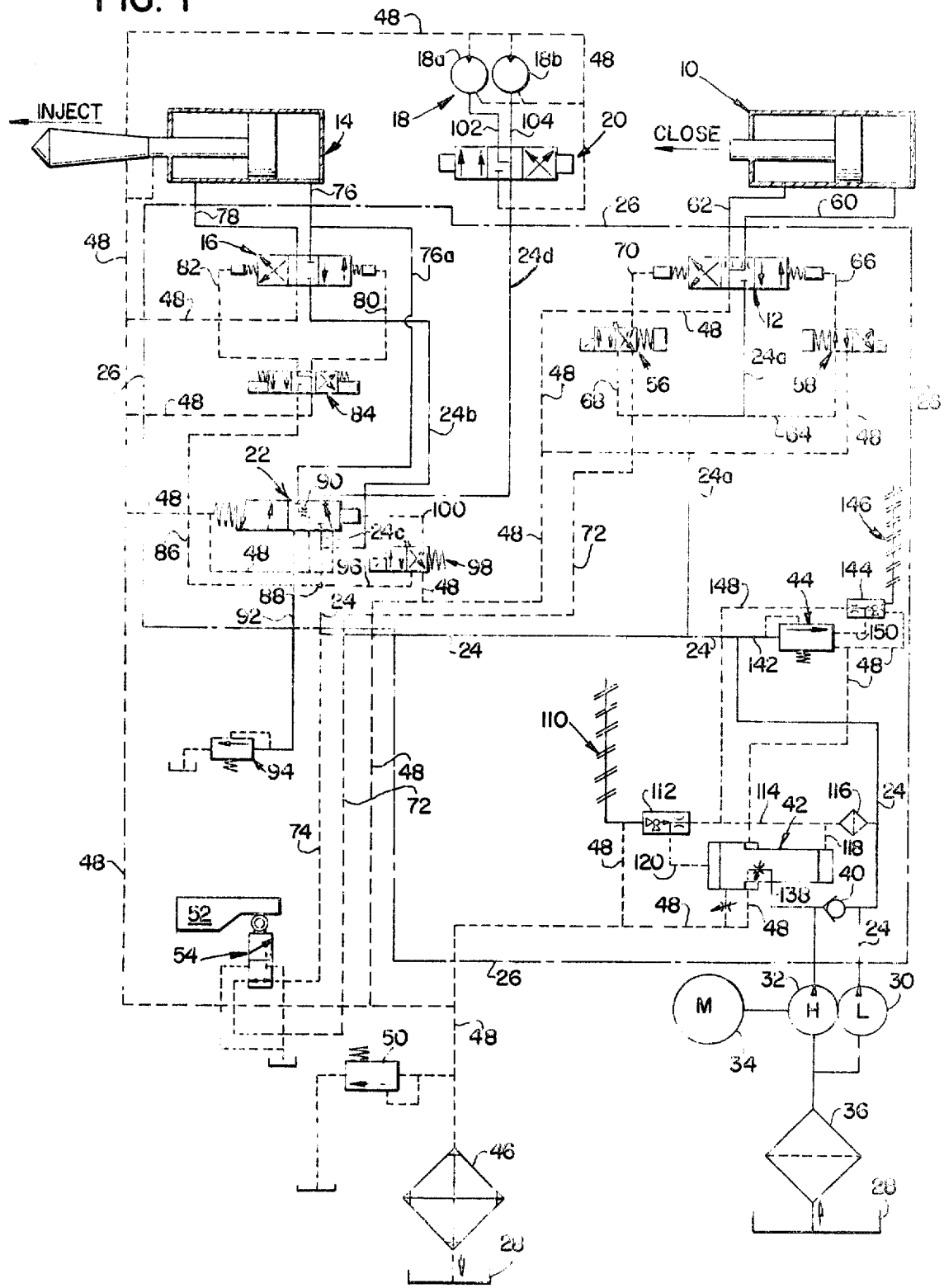
FIG. 1 is a schematic illustration of the hydraulic control system provided in accordance with the present invention.

For convenience of illustration in FIG. 1, the reversible fluid motor which opens and closes the mold halves has been schematically shown as a piston and cylinder 10 also referred to as a "die cylinder," the reversing operation of which is controlled by a die control valve 12. The reversible fluid motor for thrusting the plasticizing screw forwardly in the injection stroke is also schematically illustrated as a piston and cylinder device 14. This is also labelled as an "injection cylinder" and it is actuated by an injection control valve 16. The hydraulic motor for rotating the plasticizing screw is indicated generally by the reference number 18 and it is actuated by a screw control valve 20 which is in turn influenced by operation of an "isolation valve" 22.

The various valves mentioned above receive pressurized hydraulic fluid for operation of the devices they control through branch lines extending from a main line or conduit which is designated throughout by the reference number 24. More specifically, the die control valve 12 is connected with a pressurized branch 24a, the injection control valve 16 is connected with a pressurized branch 24b, the isolation valve is connected with a pressurized branch 24c and when properly positioned connects the branch 24c to a branch 24d extending to the screw control valve 20. In the preferred form of construction, all of the aforementioned valves and other valves to be mentioned hereinafter and the aforementioned conduits or "lines" are located or defined within the confines of a single housing, the outline of which is shown by the broken line 26.

The hydraulic fluid for the system is supplied from a low pressure reservoir 28 and the fluid is returned from the system to the reservoir. The fluid is withdrawn from the reservoir by first and second pumps 30 and 32 which are driven by a motor 34, both said pumps having their inlets connected with the reservoir through a filter 36. A first pump 30 has its outlet directly connected to the main line 24 and this pump has the capability of delivering hydraulic fluid at high pressure but at relatively low volume or flow rate. The second pump 32 has an outlet connection with the main line 24 through a check valve 40 which permits flow only toward said main line, and the said second pump has the capability of delivering high volume or high rate flow but at relatively low pressure. The said second pump 32 also has an outlet connection to a by-pass valve 42, the purpose and construction of which will be described hereinafter.

The aforementioned first and second pumps will at all time during operation maintain a substantial pressure in the main line 24 and in its branches. Thus, the hydraulic fluid is pumped from the reservoir 28 at substantial pressure, the level of which is regulated by a relief valve 44, the construction and operation of which will be described hereinafter. The hydraulic fluid is recirculated to the reservoir 28 through a heat exchanger 46 by interconnected drain lines, all of which for convenience are identified by the reference number 48. The drain line passages are maintained at a low pressure, but above atmospheric pressure by a conventional pressure relief valve 50.

OPERATION

While the die cylinder 10, the injection cylinder 14, and the screw motor 18 are all shown in neutral or non-operating condition in FIG. 1, let it be understood for purposes of describing the operation that an article has been formed in the mold cavity of the plastic injection molding machine and the mold halves have been opened for the machine operator to remove the finished part from the cavity. At this point in time, the screw motor 18 will have been operated to rotate the screw and to plasticize the material for the next injection, and in so doing, the screw will have backed up and thus retracted (moved toward the right) the piston in the injection cylinder 14. Further, in the die or mold opening operation, the piston in the die cylinder 10 will have been retracted (moved to the right).

Now, in order for the operator to have access to the area between the open mold or die halves, it will be necessary for him to slide open the operator safety gate or shield. In so doing, he will have positioned a cam 52 as shown in FIG. 1 to thereby place an operator safety valve 54 in the position shown. This valve when in the position shown prevents the flow of hydraulic fluid to the die cylinder 10 and thus prevents closing of the dies until the safety gate is again closed after removal of the finished part. The safety valve 54 is a two position valve and it will be thrust downwardly to its second position from that shown in FIG. 1 with the closing of the gate.

In the sequence of operation after removal of the finished part and the closing of the safety gate, the first step is to again close the die or mold halves and to lock them up in closed condition. Then, the next charge is injected into the mold cavity. This is accomplished by the injection cylinder 14 and its injection piston is held momentarily in the advanced position to "pack" the shot in the mold cavity. Then, the screw motor 18 is started into operation to rotate the screw and to plasticize material for the next shot. The screw retracts during plasticizing against back pressure provided in the injection cylinder 14 until a position is reached wherein there is a sufficient volume of the plasticized material in front of the screw for the following shot. During this period of time, the mold or die halves will remain closed to effect a cure and solidification of the material in the die cavity, and it may be necessary to hold the mold halves closed for an even longer period than is taken for screw retraction. Whenever the required time for cure has passed, the mold is again opened at the end of the cycle. Since the first step in operation of the next cycle is the closing of the mold, attention will be directed now to the operation of the die cylinder 10 under control of the die control valve 12.

With the die or mold halves fully open, the three position die control valve 12 and a die close pilot valve 56 and a die open pilot valve 58 associated with the die control valve 12 will all be in the neutral positions shown in FIG. 1. In this position of the die control valve 12, the hydraulic fluid at main pressure in line 24a is blocked at the said die control valve, and a line 60 from the head end of the die cylinder 10 and a line 62 from the rod end of the die cylinder are both connected through the control valve 12 to the drain 48. The die control valve 12 is held in its neutral position by hydraulic fluid at main pressure on each of its ends, the fluid being supplied to the right-hand end through lines 64 and 66 connected through pilot valve 58 and the fluid being provided at the left-hand end of the control valve 12 through lines 68 and 70 connected at the pilot valve 56.

Now, in order to close the die halves, the solenoid operated pilot valve 56 is energized to be shifted to the right. When the valve 56 is moved to the right, the pilot line 68 at main pressure is blocked at the valve 56 and the line 70 is connected through the valve 56 to a line 72 extending to the safety valve 54. If the safety valve 54 has not been moved downwardly by closing of the operator safety gate, the line 72 will be connected at the valve 54 with a line 74 which is also at main pressure. Thus, there can be no movement of the die control valve 12. However, if the safety gate has been closed and the valve 54 is moved downwardly, the line 72 will be connected at the valve 54 with a drain line 48 and thus the line 70 from the left-hand end of the die control valve 12 will also be connected to drain and this causes the die control valve to shift from right to left. With the die control valve 12 in the left hand position, the line 60 to the head end of the die cylinder 10 will be connected to main line pressure at the line 24a and the line 62 from the rod end of the die cylinder will be connected to the drain line 48. Thus, the die cylinder piston will be moved to the left to close and lock up the mold halves and pressure will be maintained on the head end of the die cylinder until the pilot valve 56 is de-energized. At such time, the pilot valve 56 and the die control valve 12 will return to the neutral position shown.

In the operation of most injection molding machines for the production of most plastic articles, the signal or command for the die control valve 12 to return to neutral will occur simultaneously with or only very slightly ahead of the signal to open the mold halves which is provided by energizing the solenoid in the pilot valve 58. When the pilot valve 58 is energized, it is moved to the left from the position shown in FIG. 1 so that the line 66 on the right-hand side of the die control valve 12 is connected to the drain 48 and the line 64 is blocked at the said pilot valve. This drains the pressure on the right-hand side of the die control valve 12 which is shifted to the right from the position shown and whereby the rod end cylinder line 62 is connected to main pressure at the line 24a and the head end line 60 is connected to the drain 48 at the control valve 12. This, of course, causes the piston in the die cylinder 10 to move to the right to open the mold or die halves.

Considering now the point in time where the die halves are closed with the screw having been previously retracted by operation of the screw motor 18 in plasticizing the material for the next shot, the next major step in operation of the machine in the cycle previously described is to thrust or advance the piston in the injection cylinder to ram the screw forwardly in the injection stroke.

In order to move the injection piston in the injection stroke from right to left in the cylinder 14, hydraulic fluid at main pressure must be introduced to the head end of the said cylinder through a line 76 while the rod end of the cylinder is connected to drain through a line 78. The said lines 76 and 78 extend to the injection control valve 16 and it will be seen that this injection control valve, which is a three-position valve, must be moved from right to left from the position shown in order to effect such connections to the injection cylinder. When the injection control valve is moved to the left, the line 76 will be connected to the line 24b at main pressure while the line 78 is connected to the drain 48 at the control valve 16.

The control valve 16 is spring biased to its neutral position shown, but it is moved to the left by introducing hydraulic fluid to the right-hand end of the valve through a line 80, and it is moved to the right by introducing hydraulic fluid at pressure through the line 82 to the left-hand end of the valve. In the neutral condition shown, these lines 80 and 82 are both connected to drain through a three-position pilot valve 84. When the pilot valve 84 is energized to shift the control valve 16 so as to inject, the said pilot valve is moved from right to left and thereby to connect the line 80 to a pilot line 86 at main pressure, the said pilot line being connected to the main line 24 at the point 88. Also in the left-hand position of the pilot valve 84, the line 82 from the control valve is connected to the drain 48. Thus, when the pilot valve 84 is moved from neutral to the left, the injection control valve 16 will be moved from neutral to left and the injection cylinder 14 will operate to inject a charge of the plastic melt.

As previously mentioned, upon completion of the injection stroke it will in most cases be desirable to keep main line pressure on the head end of the cylinder 14 to "pack" the charge in the cavity. After the time interval needed for "packing," the pilot valve 84 can be de-energized to return to its neutral position and thus to return the injection control valve 16 to its neutral position shown. However, very substantial pressure will remain in the head end of the cylinder 14, because the line 76 therefrom is blocked at the control valve 16 and a branch line 76a is connected at the isolation valve 22 through a restriction 90 to drain 48. This restriction 90 will permit pressure in the head end of the cylinder 14 to dissipate only very slowly while the isolation valve 22 remains in its normal position shown. However, upon completion of the injection stroke and the packing, the two position isolation valve is moved from its position shown to the right.

The movement of the isolation valve 22 is effected to start operation of the screw motor 18 to plasticize the next charge and to back up the plasticizing screw and the injection piston. When the isolation valve is moved to the right, the line 76a from the head end of the injection cylinder 14 is connected at the isolation valve to a line 92 extending to a relief valve or pressure control valve 94. The valve 94 is pre-set to control pressure at the head end of the injection cylinder 14 at a desired level to oppose retraction of the plasticizing screw. Also in the operating position or right-hand position of the isolation valve 22, the line 24c at main pressure is connected to the line 24d which is connected at the screw control valve 20 in its normal position to supply hydraulic fluid at main pressure to the screw motor 18. Until the isolation valve has been shifted to the right, the line 24d will have been connected to drain 48 as shown in the drawing.

The isolation valve is held in its normal position by hydraulic fluid at main pressure, such fluid being supplied from a pilot line 96 connected to the main line 24 at the point 88 and extending to a pilot valve 98 where it is connected to a line 100 extending to the right-hand end of the isolation valve 22. The isolation valve is shifted to its operating position by energizing the pilot valve 98 to move it to the right and in such position the pilot line 96 is blocked at the pilot valve while the line 100 is connected to drain and thereby permitting the isolation valve to be moved to the right by spring force.

The hydraulic motor 18 for operating the screw has been schematically illustrated as a multi-stage or variable output motor having schematically illustrated stages or sections 18a and 18b. In the normal position of the screw control valve 20, both stages 18a and 18b are connected by the lines 102 and 104 at the control valve 20 with the line 24d so that when the isolation valve is in active position both stages will be operated or driven. When the valve 20 is shifted to the left, the stage 18a will be driven and the stage 18b connected to drain, and when the control valve is shifted to the right the stage 18b will be operated and the stage 18a will be connected to drain. The control valve 20 is preferably solenoid operated to shift between its three positions in timed operation.

Whenever the screw motor 18 has been operated to complete the plasticizing and the retraction of the screw behind the next plastic charge, the isolation valve 22 is returned to its normal position shown. At the same time, it may be desirable to further retract the injection piston in the injection cylinder 14 before it is used again to inject the plastic charge build-up at the front end of the plasticizing screw. Such further retraction of the injection piston is accomplished by moving the injection control valve from left to right so that the rod end line 78 from the injection cylinder will be connected to the line 24b at the injection control valve. This is accomplished by energizing the pilot valve 84 so that it will be moved from left to right and thereby connecting the lines 82 and 86 at the pilot valve and also connecting the line 80 to the drain 48. As soon as complete retraction of the injection piston is accomplished, the pilot valve 84 is de-energized and the injection control valve 16 returns to neutral to await the signal for the next injection stroke.

As has been previously mentioned, it is desirable in a cycle of operation of the plastic injection molding machine to vary the pressure of the hydraulic fluid and also to vary its rate or volume of flow. For example, during the closing of the mold halves, it will generally be desirable to have a high rate of hydraulic flow at a comparitively modest pressure during the initial closing movement and then to reduce the rate of flow and greatly increase the pressure during the final stages of mold closing and lock-up. The desired pressure and flow modulation will not be the same for all machines in the molding of all products and will most surely be different for molding articles of different size and shape and with different plastic materials. Thus, there is an advantage in being able to modulate the by-pass or flow control valve 42 and the pressure control valve 44 according to a pre-selected program suited to the molding of a particular article on a particular machine. In accordance with this invention, a programmable electric signal generator is used to effect control of each of the said valves 42 and 44.

The invention does not depend upon the use of any specific signal generator and it is to be understood that any known device can be used which is capable of being programmed to provide either a digital or analog electric signal output. The programmed signal output from such generator for control of the by-pass valve 42 is designated by the reference number 110 in FIG. 1 and it will be seen to be imposed upon a servo valve 112 which is also of conventional construction.

The said servo valve 112 receives hydraulic fluid at main line pressure from a line 114 extending from the main line 24 through a filter 116 and having a branch 118 communicating with the right-hand end of the by-pass valve 42. The servo valve 112 is of the type which connects the line 114 with a variable orifice to control the pressure in an output line 120 extending to the other or left-hand end of the by-pass valve 42. More specifically, the valve 112 is controlled by the programmed electric signal output 110 to effect control of the pressure in the line 120 by controlling the effective orifice opening in the valve and by routing a variable proportion of the hydraulic fluid from the line 114 to the drain 48 and to the output line 120. The servo valve 112 has the capability of selecting the pressure in the line 120 over a range from zero to the main line pressure in the line 114.

Figure 2:
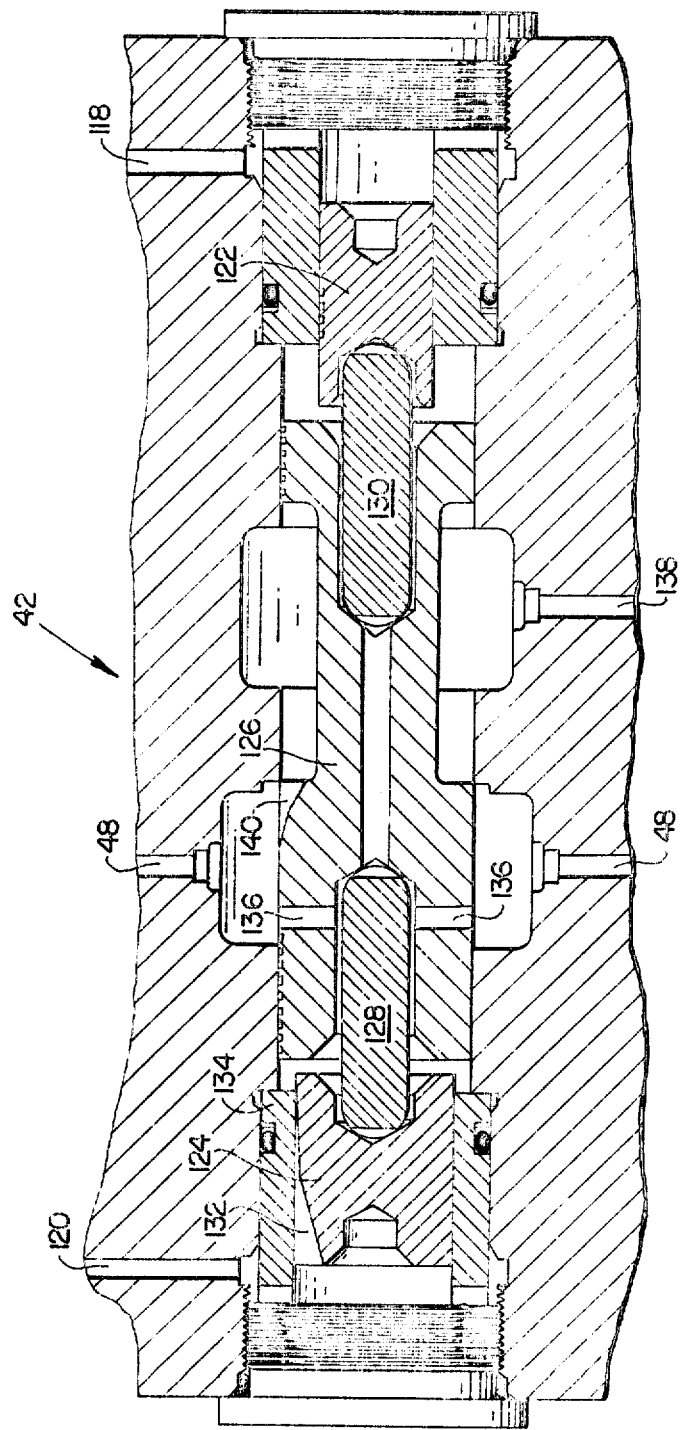
FIG. 2 is an enlarged longitudinal sectional view of the by-pass valve included in the system shown in FIG. 1.

This control of the pressure in the line 120 is effected to control the pressure differential on the opposite ends of the spool of the by-pass valve 42 as can be best be seen with reference to FIG. 2. As shown in FIG. 2, the spool for the valve 42 comprises three parts, a reduced diameter right-hand end piece 122 exposed to hydraulic fluid at main line pressure from the line 118, a larger diameter left-hand end piece 124 exposed to hydraulic fluid at the pressure dictated by the electronically controlled servo valve 112 through its output line 120, and an intermediate piece 126. The spool elements 122, 124 and 126 all move axially as a unit and are interengaged by a pair of spherical end pins 128 and 130 which are disposed in suitable cavities in the associated adjacent ends of the spool elements.

In the preferred detail of construction, the area of the exposed end of the spool element 122 on the right is one-half of the exposed end area of the element 124 on the left. This means that when the servo output pressure in the line 120 is substantially equal to one half of the main line pressure in the line 118, the three-piece valve spool in the by-pass valve 42 will not be in motion. Obviously, if the servo pressure in the line 120 becomes greater than one half the main line pressure, the spool will tend to move toward the right, and if the servo pressure 120 falls below one half the main pressure the spool will tend to move toward the left.

It would be expected that with any variation in pressure in the servo output line from one half main pressure, the by-pass valve spool would either move fully to the right or fully to the left, but this is not the case. That is, in accordance with the present invention, a circumferential series (preferably 3) of variable area axially extending grooves 132 is provided in the left-hand element 124 of the valve spool. As seen in FIG. 2, these grooves are only fully closed by a surrounding sleeve 134 when the valve spool is at its far left-hand position. This will occur only when the servo output pressure is quite low. Then, upon an increase in the servo pressure the valve spool will start to move to the right and gradually increase the flow opening through the series of grooves 132. This permits hydraulic fluid to flow through the said grooves around the left-hand element 124 and into the cavity around the pin 128. The fluid will continue to flow from the said cavity through ports 136, 136 and into a drain line 48. Thus, the grooves 132 may properly be referred to as feed-back grooves which reduce the pressure on the left-hand end of the valve spool to strike a balance of force on the opposite ends of the valve spool and to position the valve spool at a predetermined point depending upon the servo output pressure in the line 120. In other words, the by-pass valve spool will reach a certain position corresponding to a certain servo output pressure in the line 120, and such position will change with a change in the servo pressure. By providing the said feed-back grooves, the by-pass valve spool is not going to be in continuous motion.

As previously mentioned, it is the function of the valve 42 to by-pass a varying portion of the flow from the output of the high volume low pressure pump 32 to drain and thereby to control the flow or flow rate in the main line 24. The line from the output of the pump 32 to the by-pass valve 42 is designated by the reference number 138, and as seen in FIG. 2, its communication with the drain line 48 at the by-pass valve depends upon the position of the intermediate member 126 of the by-pass spool.

In substantially all positions of the spool there will be some flow from the pump line 138 to the drain 48. That is, a circumferential series (preferably 3) of variable area metering grooves 140 is provided to extend axially in the periphery of the intermediate spool member 126. The said metering grooves or slots will only be closed by the surrounding housing of the valve 42 in the far right-hand position of the spool. This will be the position assumed for maximum flow in the main line 24 according to the electronic signal program and will occur when maximum output pressure is provided in the servo line 120. For example, the program may call for this condition at the start of die closing operation.

Then, upon reduction of servo output pressure in line 120 at the left-hand end of the valve spool, the said spool will start to move toward the left to start opening the metering slots 140. As the slots 140 start to open some by-pass flow will take place from the line 138 to the drain 48 at the by-pass valve and the flow will increase due to the variable area of the slots 140 as the spool moves toward the left. When the spool reaches the far left-hand position as a result of a programmed signal for minimum pressure in the servo line 120, maximum by-pass flow will take place from the pump line 138 to the drain line 48 and this will be the minimum flow condition for the main line 24 as may occur upon the final stage of closing the mold halves. Here again, the variable area configuration of the metering slots 140 tends to reduce reciprocation of the by-pass spool in reaching a position dictated by the programmed signal to the servo valve 112.

The pressure control valve 44 can be provided as a spool valve similar to the by-pass valve 42 or it can be provided in a more conventional form to pass varying amounts of hydraulic fluid from a line 142 (FIG. 1) to drain and thereby to control the pressure in the main line 24. In any event and in any form provided for the valve 44 it too is going to be under the control of a servo valve 144 like the valve 112 and receiving programmed electric signals 146 from a programmable signal generator capable of providing digital or analog output signals. The input pressure line at main line pressure to the servo valve 144 is designated by the number 148 and the output line from the servo is designated by the number 150. As with the servo valve 112, the servo valve 144 functions to control the pressure valve 44 by controlling the flow from the line 142 to drain 48 at the said valve 44 and thereby functioning to control the pressure in the main line 24. By way of example, the servo valve 144 may be programmed to provide for maximum main line pressure at the very end of die closing operation and to provide for minimum main line pressure at the start of die closing operation.

The programming of control of operation of the by-pass valve 42 will be coordinated to the programmed control of the pressure control or relief valve 44 and thereby flow control will be modulated in cooperation with pressure control. Flow control modulation at the by-pass valve will be programmed to provide for some by-pass flow from the second pump 32 to the reservoir 18 almost continuously. That is, the composite spool in the by-pass valve 42 will in substantially all of its program controlled positions be disposed to provide at least some flow from the second pump to the reservoir through the metering slots 140. However, at specific times during machine operation, for example during injection or when high screw torque is needed or encountered, extraordinary flow at high pressure may be required. Under such "boost" requirement conditions the program can call for the by-pass spool to be moved to the extreme right-hand position and cut off all pump-to-reservoir by-pass flow and the valve 44 can be programmed to provide for high pressure at the same time. Such "boost" conditions will be programmed for short duration in the interest of horse power economy and to avoid overload.

A principal advantage obtained with the control system is its capability to economize on horse power by providing the proper flow and pressure needed for the various conditions encountered in the cycle of machine operation. An other important advantage is the "fail safe" control in the event of electrical failure. In such event, the flow from the second pump 32 is fully by-passed to the reservoir in the manner described.

I claim:

1. An hydraulic control system for a plastic injection molding machine having mold halves which are opened and closed hydraulically by a reversible fluid motor actuated by a die control valve, said system including a low pressure reservoir and means defining a main line for pressure flow from the reservoir to the die control valve and a drain line from the die control valve to the reservoir, a first driven pump in said main line capable of high pressure but relatively low rate delivery to provide the final closing force on the mold halves, a second driven pump capable of high rate but relatively low pressure delivery to provide the force for most of the relative movement of the mold halves and having its inlet connected with said reservoir and having an outlet connection to said main line which permits flow only toward said main line, a by-pass valve connected between the outlet of said second pump and said reservoir and including a member hydraulically movable to various positions to vary the flow from said outlet to said reservoir and thereby to vary the flow from said second pump to the die control valve through said main line, a first servo valve connected between said main line and said by-pass valve and having a drain connection to said reservoir whereby to control hydraulic pressure acting upon said movable member, and means for modulating the operation of said servo valve to vary the position of said movable member in said by-pass valve, the said movable member comprising an axially movable spool having one end of reduced area exposed in the by-pass valve to hydraulic fluid at main line pressure, and the other end of the spool being exposed to hydraulic fluid at the pressure controlled by said first servo valve.

2. A system as defined in claim 1 wherein the means for modulating said first servo valve is electrical.

3. A system as defined in claim 1 wherein an hydraulically operable variable pressure relief valve is provided with its inlet connected to said main line downstream of said first and second pumps and with its outlet connected to said reservoir, a second servo valve is connected between said main line and said relief valve and has a drain connection to said reservoir to control hydraulic pressure acting on said relief valve, and means is provided for modulating the operation of said second servo valve to select and vary the pressure in said main line.

4. A system as set forth in claim 3 wherein the means for modulating said first and second servo valves is electrical.

5. The system as defined in claim 1 wherein said spool has at least one axial metering slot to assure some flow from said second pump to said reservoir in substantially all positions of said spool and to increase such flow as said spool is moved toward its other end.

6. The system of claim 5 wherein the first servo valve is constructed and arranged to admit fluid at minimal pressure to said other end of the spool in the event of operative failure of said means for modulating the said first servo valve, thus assuring maximum by-pass flow from said second pump to said reservoir in the event of such failure.

7. An hydraulic control system for a plastic injection molding machine having mold halves which are opened and closed hydraulically by a reversible fluid motor actuated by a die control valve and having a plastic melt injecting means which is advanced by a reversible fluid motor actuated by an injection control valve, said system including a low pressure reservoir and means defining a main line for pressure flow from the reservoir to both said control valves and a drain from both said control valves to said reservoir, a first driven pump in said main line capable of high pressure but relatively low rate delivery to provide the final closing force on the mold halves, a second driven pump capable of high rate but relatively low pressure delivery to provide the force for most of the relative movement of the mold halves and having its inlet connected with said reservoir and having an outlet connection with said main line which permits flow only toward said main line, a bypass valve connected between the outlet of said second pump and said reservoir and including a member hydraulically movable to vary the flow between said outlet and reservoir and thereby to vary the flow from the said second pump to the main line, a first servo valve connected between said main line and by-pass valve and having a drain connection to said reservoir and being adapted to control the hydraulic pressure on said movable member, and electrical means programmed for operation of said mold halves and said injecting means modulating the operation of said servo valve to effect movement of said movable member.

8. The system of claim 7 wherein an hydraulically operable variable pressure relief valve is provided with its inlet connected to said main line, a second servo valve is connected between said main line and relief valve and has a drain connection to said reservoir to control the operating hydraulic pressure on said relief valve, and means is provided for modulating the operation of said second servo valve to select and vary the pressure in said main line.

9. A system as provided in claim 8 wherein the means for modulating said second servo valve is electrical and programmed for operation of said mold halves and injecting means.

10. An hydraulic control system for a reciprocating screw-type plastic injection molding machine having mold halves which are opened and closed hydraulically by a reversible fluid motor actuated by a die control valve and having a reciprocating screw which is rotated to plasticize plastic material by an hydraulic motor controlled by an isolation valve and which is thrust forwardly to inject plasticized melt by a reversible fluid motor actuated by an injection control valve, said system including a low pressure reservoir and means defining a main line for pressure flow from the reservoir to both said control valves and said isolation valve and a drain to said reservoir from said control valves and isolation valve, a first driven pump in said main line capable of high pressure but relatively low rate delivery to provide the final closing force on the mold halves and the final injecting movement of the screw, a second driven pump capable of high rate but relatively low pressure delivery to provide the force for the remainder of movement of the mold halves and injecting movement of the screw and having its inlet connected with said reservoir and having an outlet connection with said main line which permits flow only toward said main line, a by-pass valve connected between the outlet of said second pump and reservoir and including a member hydraulically movable to vary the flow from said outlet to said reservoir and thereby to vary the flow from said second pump to said main line, a first servo valve connected between said main line and by-pass valve and having a drain connection to said reservoir and being adapted to control the hydraulic pressure on said movable member, and electrical means programmed for operation of said mold halves and for rotation and injection of said screw modulating the operation of said servo valve to effect movement of said movable member.

11. The system of claim 10 wherein an hydraulically operable variable pressure relief valve is provided with its inlet connected to said main line, a second servo valve is connected between said main line and relief valve and has a drain connection to said reservoir to control the operating hydraulic pressure on said relief valve, and means is provided for modulating the operation of said second servo valve to select and vary the pressure in said main line.

12. A system as defined in claim 11 wherein the means for modulating said second servo valve is electrical and programmed for operation of said mold halves and for rotation and injection movement of said screw.

* * * * *